(12) United States Patent
Lin

(10) Patent No.: US 7,035,502 B2
(45) Date of Patent: Apr. 25, 2006

(54) SIGNAL INTERCONNECT INCORPORATING MULTIPLE MODULAR UNITS

(75) Inventor: Philip J. Lin, Newton, MA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 10/922,437

(22) Filed: Aug. 19, 2004

(65) Prior Publication Data

US 2005/0020123 A1    Jan. 27, 2005

Related U.S. Application Data

(63) Continuation of application No. 09/808,331, filed on Mar. 14, 2001, now Pat. No. 6,801,680.

(60) Provisional application No. 60/222,352, filed on Aug. 1, 2000.

(51) Int. Cl.
*G02B 6/26* (2006.01)

(52) U.S. Cl. .............. 385/17; 385/16; 385/15
(58) Field of Classification Search ........ 385/14, 385/15, 16, 17, 31, 39, 46; 359/128, 117, 359/123, 139
See application file for complete search history.

(56) References Cited

U.S. PATENT DOCUMENTS

| | | | |
|---|---|---|---|
| 3,840,704 A * | 10/1974 | Baugh | 370/294 |
| 4,787,693 A | 11/1988 | Kogelnik et al. | |
| 5,043,975 A * | 8/1991 | McMahon | 398/58 |
| 5,123,011 A * | 6/1992 | Hein et al. | 370/380 |
| 5,259,051 A * | 11/1993 | Burack et al. | 385/76 |
| 5,500,858 A | 3/1996 | McKeown | |
| 5,703,707 A | 12/1997 | Dieudonne et al. | |
| 5,812,088 A | 9/1998 | Pi et al. | |
| 5,937,117 A * | 8/1999 | Ishida et al. | 385/24 |
| 5,959,748 A | 9/1999 | Jahreis | |
| 6,243,178 B1 | 6/2001 | Suemura et al. | |
| 6,330,102 B1 | 12/2001 | Daneman et al. | |
| 6,567,858 B1 * | 5/2003 | Yang et al. | 709/238 |
| 6,801,680 B1 | 10/2004 | Lin | |
| 2002/0093950 A1 * | 7/2002 | Li | 370/360 |
| 2002/0093952 A1 * | 7/2002 | Gonda | 370/369 |

OTHER PUBLICATIONS

Philip J. Lin, Wide Area Optical Backbone Networks. Doctorial Dissertation, © Massachusetts Institute of Technology Feb. 1996; Cambridge, Massachusetts, USA.

* cited by examiner

*Primary Examiner*—Kaveh Cyrus Kianni
(74) *Attorney, Agent, or Firm*—Welsh & Katz, Ltd.

(57) ABSTRACT

An interconnect element incorporates a plurality of smaller, substantially identical, interconnect modules. Multiple identical elements can in turn be combined to form larger interconnect networks. Signal paths in the elements can be implemented with optical fibers or electrical conductors.

21 Claims, 4 Drawing Sheets

SIGNAL INTERCONNECT INCORPORATING MULTIPLE MODULAR UNITS

This application is a continuation of application Ser. No. 09/808,331 filed Mar. 14, 2001 now U.S. Pat. No. 6,801,680, which claims the benefit of the filing date of Provisional Application Ser. No. 60/222,352 filed Aug. 1, 2000 and entitled "Building Large Optical Interconnect From Smaller Modular Units".

FIELD OF THE INVENTION

The invention pertains to optical cross-connect switches. More particularly, the invention pertains to such switches which incorporate modular interconnect fabrics.

BACKGROUND OF THE INVENTION

Optical switches are known and are useful in implementing optical communications networks using fiberoptic transmission lines. In such networks, it is at times necessary to switch the optical signals between optical transmission paths.

One known type of optical switch is an optical cross-connect switch. In such switches, in a general case, any one of N input lines can be coupled to any one of N output lines.

One known type of cross-connect switch 10 is implementable using the Spanke architecture illustrated in FIG. 1. In a Spanke architecture with N inputs and N outputs, N 1×N switches 12a, b, c, . . . n are connected by an interconnect fabric 16 to N 1×N output switches 18a, b . . . n.

The interconnect fabric 16 has $N^2$ total static connections. One connection is between each input-output pair of switches. Therefore, an N×N fabric has a total of $N^2$ fibers with $N^2$ inputs and $N^2$ outputs.

Insertion loss is a major concern in optical cross-connect switches. Although a single stage Spanke design can achieve small insertion loss, this solution creates yet another problem: namely, the difficulty of creating the large interconnecting fabric because the fabric contains $N^2$ connections.

Methods are known to implement small interconnect fabrics. For example, pre-routed fibers can be sandwiched between flexible plastic sheets sometimes called optical flypapers. They are however very difficult to create for N>32. Alternately, the interconnections can be made from $N^2$ individual fibers. However, this solution is time consuming to build and difficult to maintain.

There thus continues to be a need to be able to cost effectively design and implement larger cross connect switches of various sizes. It would be especially advantageous if it would not be necessary to custom create a different interconnect networks for each switch. Preferably, a known interconnect design can be reliably and cost effectively manufactured and could be used to implement a variety of switches.

SUMMARY OF THE INVENTION

A recursive process for creating large signal interconnects from a plurality of smaller, standardized, interconnect modules, which could incorporate individual optical fibers or electrical conductors, produces interconnect systems for specific applications using only standard modular building blocks. In accordance with the method, a first modular K×K interconnect network having $K^2$ signal carriers is defined and implemented. For L inputs, $$\frac{L}{K}$$

input groups are formed. For M outputs, $$\frac{M}{K}$$

output groups are defined.
A plurality of $$\left(\frac{L}{K} \times \frac{M}{K}\right)$$

of the first modular interconnects can be used to form an L×M passive interconnect network having L×M signal carriers.

A plurality of the L×M, modular interconnects, all of which are substantially identical, and all of which are based upon multiples of the basic K×K modular interconnect can be combined to form a larger N×N interconnect. For example, where L=M, and where N is an integer multiple of M, $$\frac{N}{M}$$

input groups and $$\frac{N}{M}$$

output groups result in $$\left(\frac{N}{M}\right)^2$$

M×M modules being needed to implement the N×N connectivity. This type of network is especially desirable in that economies of scale in manufacturing, reliability and inventory can be achieved since N×N networks for various values of N can be implemented using multiple, identical K×K basic building blocks which in turn form the larger M×M assemblies which are combined to make the N×N networks.

In one embodiment, an N×N cross-connect switch incorporates a plurality of substantially identical interconnect modules. A plurality of input switches is coupled to $N^2$ inputs to the modules. A plurality of output switches is coupled to $N^2$ output sides of the modules.

In one aspect, the switches can be divided into groups with one set of groups associated with the input sides of some of the modules and another set of groups associated with the output sides.

In another aspect, a switch requiring N inputs and N outputs can be implemented with multiple identical modules that have $K^2$ inputs and $K^2$ outputs. The number of required modules is $(N/K)^2$. In such configurations, the connectivity between the interconnect, a plurality of 1×N input switches and a plurality of N×1 output switches can be implemented using optical ribbon cables. The pluralities of switches each contain N switches.

Interconnect modules can be implemented with optical transmitting fibers. Alternately, they could be implemented with electrical conductors.

A method of implementing an N×N cross-connect switch includes establishing a K×K modular interconnect where K<N. Providing $$\left(\frac{N}{K}\right)^2$$

interconnect modules. Coupling $N^2$ inputs to and receiving $N^2$ outputs from the modules.

In yet another aspect, interconnects implemented from pluralities of smaller interconnect modules can in turn become modular building blocks for even larger interconnect fabrics. In accordance herewith M×M fabrics can be implemented with smaller N×N building blocks. In one embodiment, M is an integer multiple of N.

Non-symmetrical switches with N1 inputs and N2 outputs can be implemented using K×K interconnect modules where K<N1 and K<N2. With $$\frac{N1}{K}$$

input groups and $$\frac{N2}{K}$$

output groups, $$\left(\frac{N1}{K} \times \frac{N2}{K}\right)$$

interconnect modules will be required.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
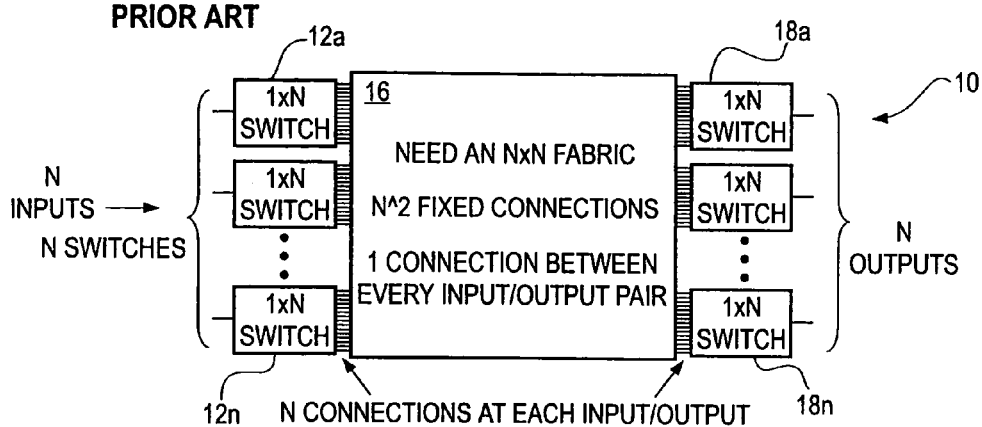
FIG. 1 is a block diagram schematic of a known cross-connect switch.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 2:
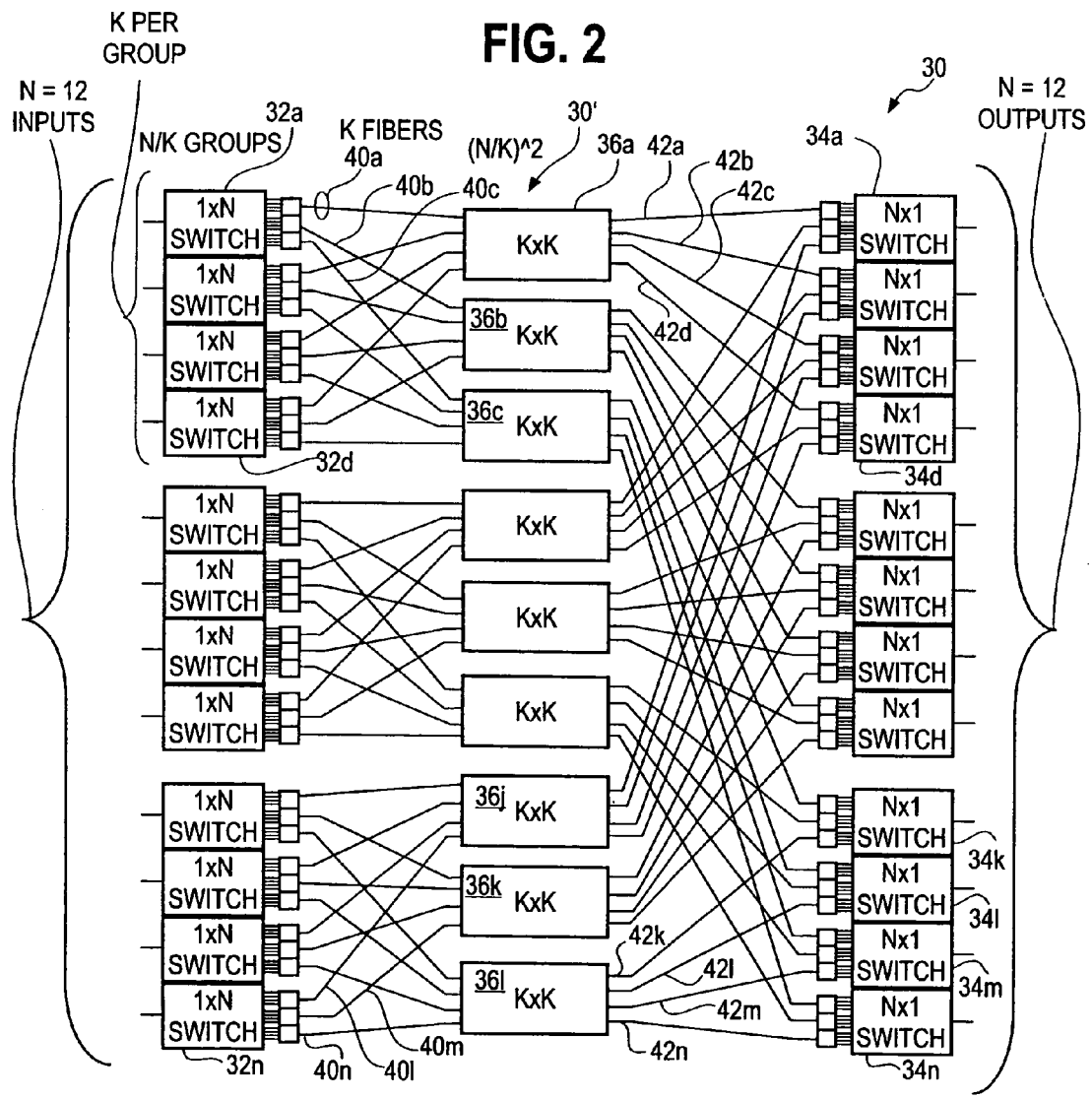
FIG. 2 is a block diagram schematic of a modular cross-connect switch in accordance with the present invention.

FIG. 2 illustrates a 12×12 cross-connect switch 30 in accordance with the present invention. It will be understood that while switch 30 has been illustrated for exemplary purposes as a 12×12 cross-connect switch, the number of inputs and the number of outputs is not limited to 12 and could be N>12. It will be also understood that the inputs to and outputs from the switch 30 could be light beams or could be electrical signals without departing from the spirit and scope of the present invention.

Switch 30 includes N input switches 32a . . . 32n. In the illustrated embodiment, N=12, there would be 12 input switches each of which would be a 1×N type of switch, such as a 1×12 switch. The switch 30 also includes N, N×1 output switches 34a . . . 34n. In the illustrated example in FIG. 2, there would be 12 such output switches which would have 12 inputs and one output at each switch.

The input switches and the output switches are coupled together by a plurality 30' of substantially identical, static, modular K×K interconnect elements 36a . . . 36l, K<N. The number of elements is, $$\left(\frac{N}{K}\right)^2.$$

Where N=12 and K=4, then nine 4×4 interconnect elements are required.

Figure 2A:
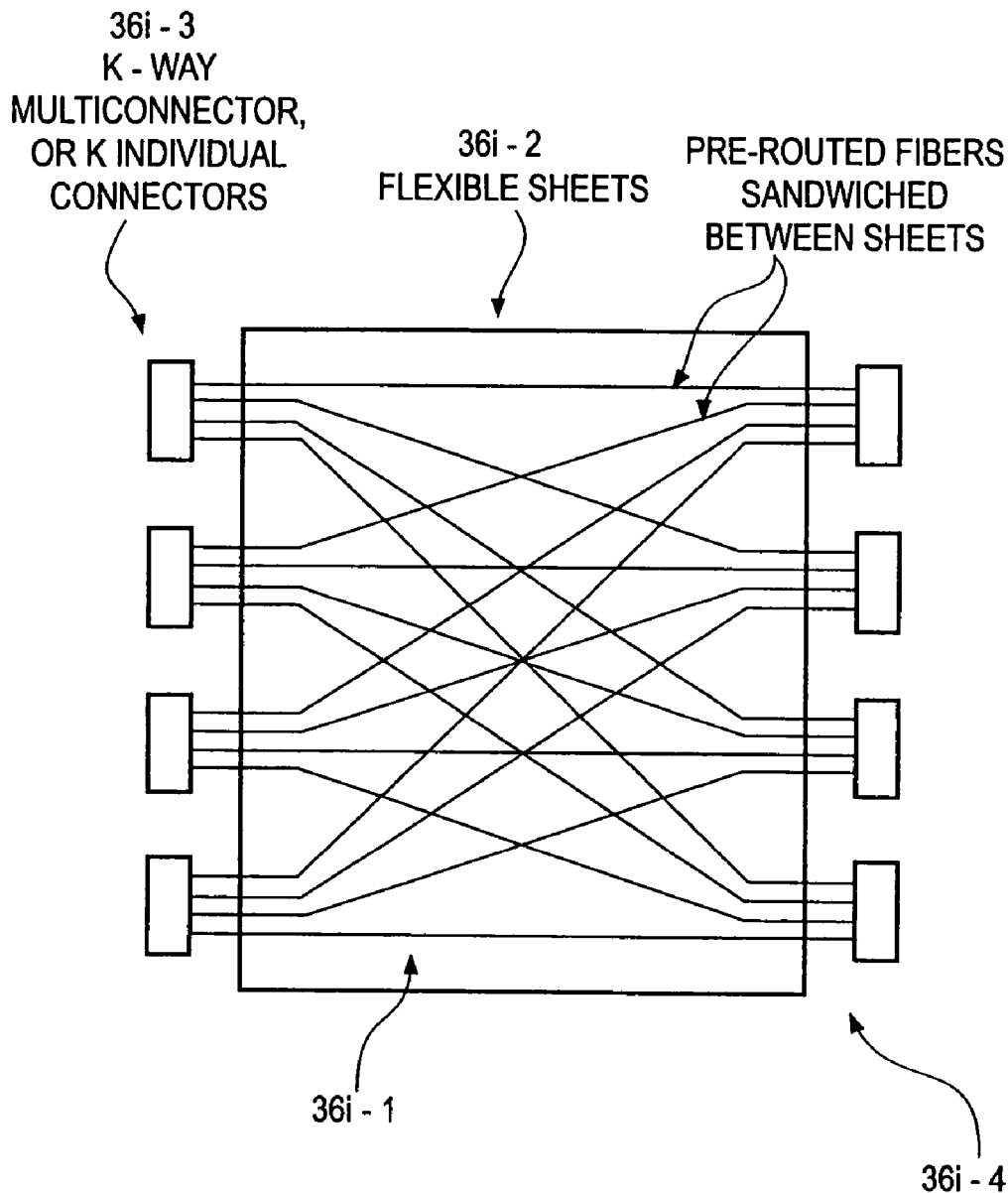
FIG. 2A is a schematic diagram of a modular K×K interconnect module usable in the switch of FIG. 2.

Each modular K×K, interconnect element has $K^2$ inputs and $K^2$ outputs. A representative 4×4 modular interconnect element, such as element 36i, having 16 inputs that are coupled to 16 outputs is illustrated in FIG. 2A. Such modules include a plurality of pre-routed signal carriers 36i-1 optical fibers or electrical conductors. Sixteen signal carriers, for the illustrated 4×4 module, are sandwiched between a pair of plastic sheets, or attached to a single sheet, 36i-2.

A first plurality of four, 4-way connectors 36i-3 and a second plurality of four, 4-way connectors 36i-4 complete the module the connectors can be individual or multi-path connectors.

The switch 30, as noted previously has, $$\left(\frac{N}{K}\right)^2$$

interconnect elements, for example, nine 4×4 elements 36a, b ... 36l. The input switches are organized into $$\left(\frac{N}{K}\right)$$

groups, namely 3 groups. With $$\left(\frac{N}{K}\right)$$

groups, each K×K interconnect module connects a single input group to a single output group with $$\left(\frac{N}{K}\right)^2$$

group pairs, the number of K×K interconnect modules.

Each group of K fibers such as 40a, 42a can be formed of individual fibers, or, of K-wide fiber ribbon cables having K-wide multi-fiber optical connectors.

Figure 3:
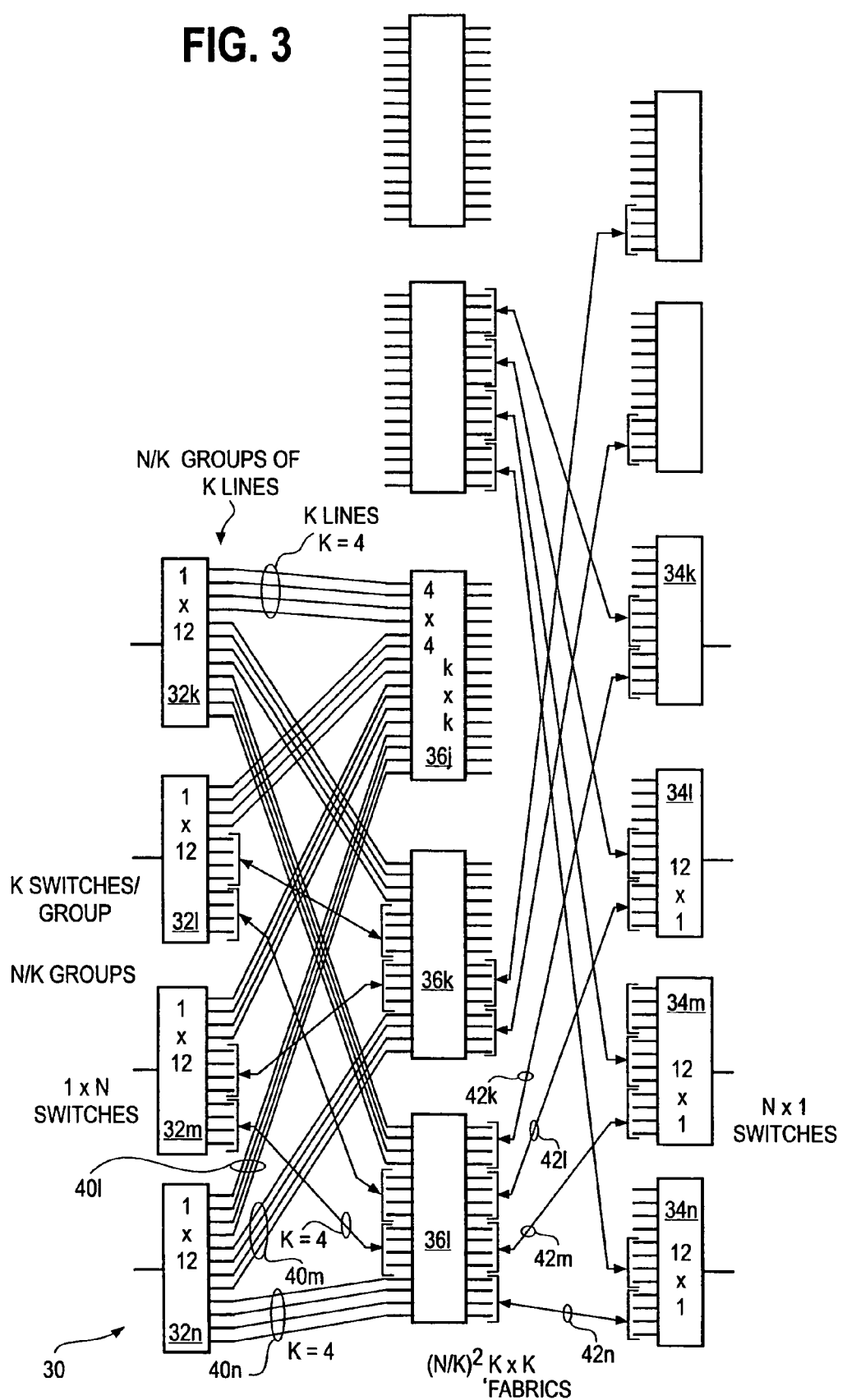
FIG. 3 is a more detailed schematic diagram of a portion of the switch of FIG. 2 illustrating, in part, connectivity therein in more detail.

Each group includes, for K=4, four 1×12 input switches such as 32a, 32b, 32c, 32d. Groups of K fibers, such as fiber groups 40a, 40b, 40c are coupled to K respective inputs each of interconnect elements 36a, 36b and 36c. With respect to input switch 32n, 3 groups of K fibers, 40l, 40m, 40n, where K=4, are coupled to respective inputs of K×K fabric interconnect modules 36j, 36k, 36l. FIG. 3 illustrates in more detail connections for a portion of the exemplary switch 30.

Output switches 34a, 34b, 34c, 34d receive groups of fibers, 42a, 42b, 42c, and 42d, where K=4, from K×K interconnect module 36a. In the same way, K×K interconnect module 36l is coupled via groups of K fibers, such as 42k, 42l, 42m and 42n to 1×N, illustrated as 1×12, output switches 34k, 34l, 34m, 34n.

The architecture of switches such as switch 30 in FIG. 2 is expandable and variable depending on the value of N and the value of K. As an alternate, if N=128 and K=32, the number of interconnect modules $$\left(\frac{N}{K}\right)^2$$

is 16. In this instance, each interconnect module would have $K^2$ or $32^2$ inputs and the same number of outputs.

The use of multiple, smaller, modular interconnect elements, as illustrated in FIG. 2, makes it possible to build interconnects where N is a large number, such as for example 128 or larger, using only a plurality of K×K modular interconnect units to form an interconnecting sheet. All of the units can be manufactured so as to be substantially identical.

While the K×K modules 36a ... 36l as disclosed in FIG. 2 can incorporate a plurality of optical fiber lines, similar interconnects could be implemented using, modular electrical conductors. The above described signal carrier management process produces interconnects quite unlike the prior art of either a single pre-routed fabric of $N^2$ fibers or $N^2$ individual fibers.

The ability to implement increasingly larger switches using pluralities of a common interconnect module, to form interconnecting sheets, has important manufacturing, inventory control and quality control consequences. Only one, or at most a few, standard fiber or wire interconnect modules need be manufactured. Hence, the manufacturing process can be optimized to produce a few different types of modules. Since manufacturing turn around time can be minimized, less inventory needs to be maintained. Finally, quality control can be improved, and enhanced since fewer configurations are being created.

Common interconnect modules are also advantageous from a maintenance point of view. In case of a cut or failed fiber or wire only that respective modular interconnect element need be replaced.

The K×K interconnect modules of FIG. 2 can be used to implement non-symmetrical switches. For example, with N1 inputs and N2 outputs, $$\frac{N1}{K}$$

input groups and $$\frac{N2}{K}$$

output groups can be defined. These result in $$\left(\frac{N1}{K} \times \frac{N2}{K}\right)$$

input/output group pairs and interconnect modules to implement the required network. Input switches and output switches can be coupled to the network.

Figure 4:
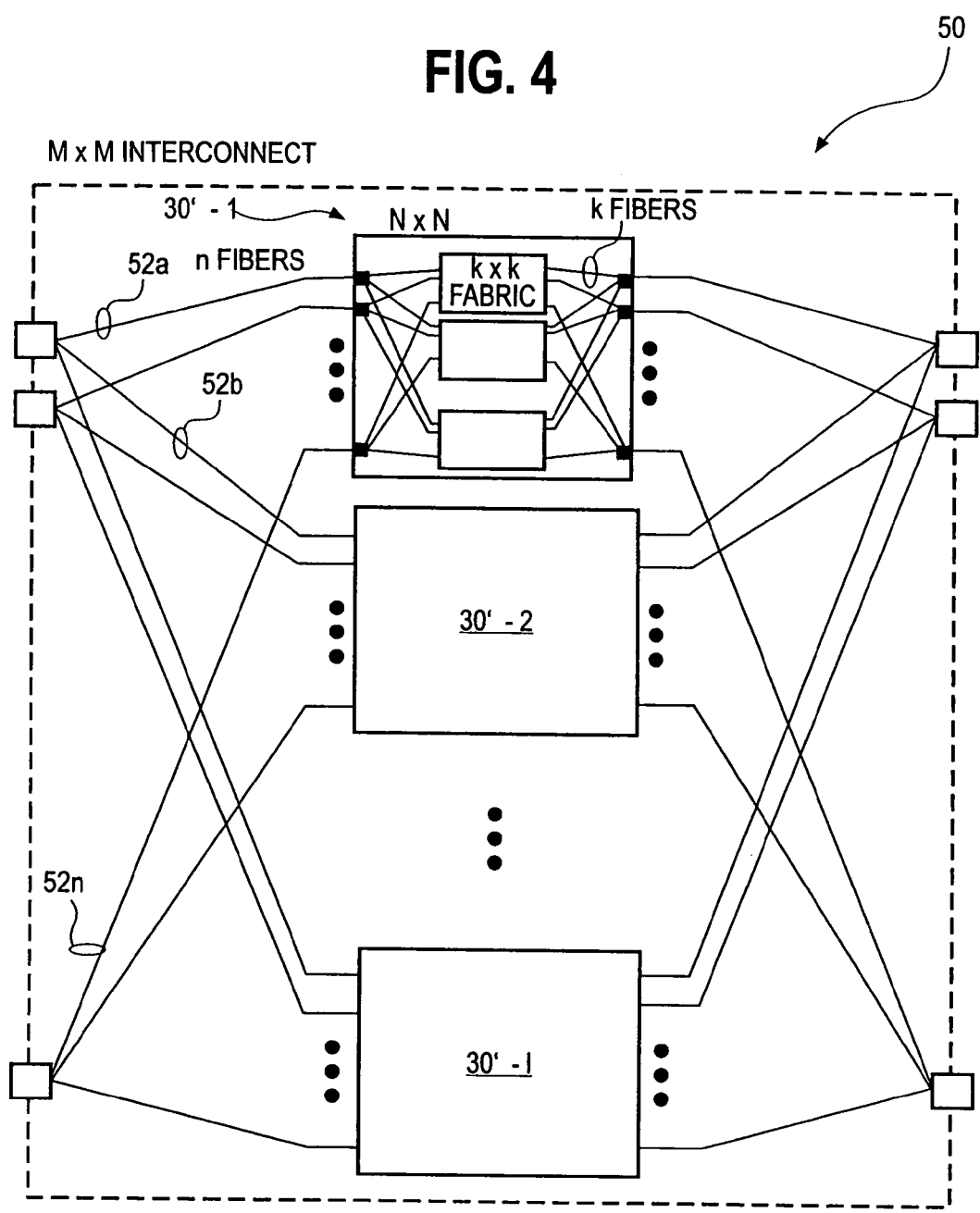
FIG. 4 is a block diagram schematic of a larger interconnect network incorporating two levels of interconnect modules in accordance with the present invention.

FIG. 4 illustrates an even larger M×M interconnect 50. Where M is an integer multiple of N, the interconnect 50 can be implemented using a plurality of N×N interconnect modules, such as the module 30'-i which corresponds to interconnect 30' of FIG. 2. The recursive application of the modules 30', which in turn are based upon the smaller K×K submodules of FIG. 2, makes the construction of even larger interconnects practical as they are all ultimately based on two modular interconnect elements One modular building block is the basic k×k modular fabric element, such as the element 36a or 36l illustrated in FIGS. 2 and 3. A second modular building block is the N×N composite fabric element 30' provided that M is an integer multiple of N. If desired, multiple modular M×M interconnects an be combined into yet a larger network.

As illustrated in FIG. 4, in the network 50, groups of N signal carriers, such as the groups 52a, 52b ... 52n coupled to interconnect module 30'-1 are combined with groups of N carriers coupled to other modules such as 30'-2 ... 30'k to form the composite M×M interconnecting sheet 50. With N carriers in a group, there will be $$\frac{M}{N}$$

groups resulting in $$\left(\frac{M}{N}\right)^2$$

interconnect modules, such as the module 30'-1 being required. Each N×N interconnect module connects a single input group of N to a single output group with $$\left(\frac{M}{N}\right)^2$$

group pairs. Those of skill will understand that the interconnect 50 could be combined with appropriate types of input/output switches as discussed previously with respect to FIG. 2.

It will also be understood that the M×M interconnect modules 50 can be similarly combined, as discussed above to create larger interconnect networks, again from a plurality of substantially identical M×M modules.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A signal coupling network comprising:
a plurality of substantially identical, static signal interconnect modules, coupling to N inputs to N outputs, each module having a selected number of K squared module inputs and the same number of module outputs, each of the inputs is coupled to only one of the outputs by a respective signal carrying conduit with each output substantially identical to a respective input by a total of N squared divided by K squared modules.

2. A network as in claim 1 which includes a plurality of input switches, the plurality including a predetermined number of members, each input switch has one signal input and a plurality of identical signal outputs, the identical signal outputs are each coupled to a respective one of the inputs.

3. A network as in claim 1 which includes a plurality of output switches, each output switch has a plurality of signal inputs and one signal output, the members of the pluralities of signal inputs are each coupled to a respective one of the module inputs.

4. A network as in claim 2 where the plurality of input switches contain as many members as each switch has outputs.

5. A network as in claim 1 where each of the members of the plurality of modules is in turn formed of a second plurality of smaller static signal interconnect modules, the members of the second plurality are substantially identical and each contains a second selected number of inputs and outputs, the second selected number is less than the selected number, each output of the second plurality is substantially identical to a respective input.

6. A network as in claim 5 where the second plurality includes a number of modules corresponding to a ratio of the selected number to the second selected number.

7. A network as in claim 1 where the conduits comprise one of, static optical signal paths, or, static electrical signal paths.

8. A network as in claim 7 which includes a plurality of optical switches coupled to inputs of the modules.

9. A network as in claim 7 which includes a plurality of optical switches coupled to outputs of the modules.

10. A network as in claim 1 where each module includes a plurality of L×L submodules where L is less than K and where each submodule includes L squared separate, passive signal carriers which couple each of L squared inputs to a different one of L squared outputs with each output substantially identical to a respective input.

11. A network as in claim 10 where the plurality of L×L modules corresponds in number to K squared divided by L squared modules.

12. A signal coupling network comprising:
a plurality of substantially identical, static signal interconnect modules, each module having a selected number of inputs and a selected number of module outputs, each of the inputs is coupled to only one of the outputs by a respective signal carrying conduit with each output substantially identical to a respective input where the signal conduits are each bi-directional.

13. A network as in claim 12 where a number of signal paths of the module corresponds to the number of inputs.

14. A network as in claim 13 which includes a plurality of input switches coupled to the inputs of the interconnect modules, that plurality has a predetermined number of switches.

15. A network as in claim 14 where the input switches each include a single switch input and a number of outputs that correspond to the number of switches in the plurality of input switches.

16. A network as in claim 15 where each input switch forms a number of groups of outputs, each group of outputs is coupled to a different module.

17. A network as in claim 16 where the modules form the same number of groups as do the input switches.

18. A network as in claim 16 where the number of modules corresponds to the number of groups squared.

19. A network as in claim 12 where each module comprises a second selected number of substantially identical static interconnect sub-modules, each sub-module has a third number of inputs and outputs, the third number is less than the second number, each of the third number of inputs of a selected sub-module is coupled to a respective one of the third outputs of that sub-module by a separate static signal path.

20. A signal coupling network comprising:
a plurality of substantially identical, static, signal interconnect modules, each module having a selected number of module inputs and the same number of module outputs, each of the inputs is coupled to only one of the outputs by a respective signal carrying conduit with each output substantially identical to a respective input; and where each of the members of the plurality of modules is in turn formed of a second plurality of smaller static signal interconnect modules, the members of the second plurality are substantially identical and each contains a second selected number of inputs and outputs, the second selected number is less than the selected number, each output of the second plurality is substantially identical to a respective input.

21. A signal coupling network as in claim 20 where the second plurality includes a number of modules corresponding to a ratio of the selected number to the second selected number.

* * * * *

UNITED STATES PATENT AND TRADEMARK OFFICE
CERTIFICATE OF CORRECTION

| | | |
|---|---|---|
| PATENT NO. | : 7,035,502 B2 | Page 1 of 1 |
| APPLICATION NO. | : 10/922437 | |
| DATED | : April 25, 2006 | |
| INVENTOR(S) | : Philip J. Lin | |

It is certified that error appears in the above-identified patent and that said Letters Patent is hereby corrected as shown below:

Column 4,
Line 22, change "N>12." to "N≥12."
Line 58, insert "." after "module"

Column 6,
Line 59, change "361" to "36I"

Signed and Sealed this

Twenty-ninth Day of August, 2006

JON W. DUDAS
*Director of the United States Patent and Trademark Office*